US010119643B2

(12) United States Patent
Yanagimoto et al.

(10) Patent No.: US 10,119,643 B2
(45) Date of Patent: Nov. 6, 2018

(54) FUEL PIPING STRUCTURE

(71) Applicant: TOYOTA JIDOSHA KABUSHIKI KAISHA, Toyota-shi, Aichi-ken (JP)

(72) Inventors: Tasuku Yanagimoto, Nissin (JP); Masaharu Ichise, Kiyosu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 80 days.

(21) Appl. No.: 15/258,606

(22) Filed: Sep. 7, 2016

(65) Prior Publication Data

US 2017/0122479 A1     May 4, 2017

(30) Foreign Application Priority Data

Nov. 2, 2015 (JP) ................................. 2015-215607

(51) Int. Cl.
| | | |
|---|---|---|
| *F16L 41/00* | (2006.01) | |
| *F16L 55/07* | (2006.01) | |
| *F02M 55/00* | (2006.01) | |
| *G01L 19/00* | (2006.01) | |

(Continued)

(52) U.S. Cl.
CPC .............. *F16L 55/07* (2013.01); *F02M 55/00* (2013.01); *F02M 55/02* (2013.01); *G01L 19/0007* (2013.01); *G01M 3/2853* (2013.01); *F02M 2200/24* (2013.01)

(58) Field of Classification Search
CPC .... G01M 3/2815; G01M 3/002; G01M 3/045; G01M 3/184; G01M 3/26; G01M 3/24; G01M 3/243; G01M 3/246; G01M 3/2807; G01M 3/00; F16L 41/008; F16L 55/07; F02M 55/00; F02M 55/02
USPC ....... 73/40, 40.5, 49.5, 40.5 R, 40.5 A, 49.1, 73/40.7, 46; 138/90, 92, 94
See application file for complete search history.

(56) References Cited

U.S. PATENT DOCUMENTS 2,752,228 A * 6/1956 Gould .................. F16L 41/008
                                                  422/50
4,309,899 A * 1/1982 Torres .................. G01N 17/046
                                                  73/86

(Continued)

FOREIGN PATENT DOCUMENTS

| JP | H04-126093 U | 11/1992 |
|---|---|---|
| JP | H10-61513 A | 3/1998 |

(Continued)

*Primary Examiner* — Charles P Cheyney
(74) *Attorney, Agent, or Firm* — Oliff PLC

(57) ABSTRACT

A fuel piping structure includes a fuel pipe, a pressure sensor in communication with the fuel pipe through a communication channel, and a sensor holding part including a projecting part projecting to an outer-peripheral side, being connected to the fuel pipe, and holding the pressure sensor disposed therein. A ring-shaped elastic member is provided between an underside of the projecting part and the fuel pipe, the projecting part being pressed against the fuel pipe. The tip side of the sensor holding part on which a ring-shaped seal member is provided is inserted into a recessed part of the fuel pipe and in communication with the inside of the fuel pipe, and the communication channel is in communication with the recessed part. In the sensor holding part, a conduction channel for a seal test is formed from an end face of the projecting part to the seal member.

3 Claims, 7 Drawing Sheets

(51) Int. Cl.
  *G01M 3/28* (2006.01)
  *F02M 55/02* (2006.01)

(56) References Cited

U.S. PATENT DOCUMENTS

| | | | | |
|---|---|---|---|---|
| 5,082,367 A | * | 1/1992 | Kohler | F16L 23/006 |
| | | | | 324/446 |
| 5,789,679 A | | 8/1998 | Koshimizu et al. | |
| 5,855,397 A | | 1/1999 | Black et al. | |
| 6,474,170 B1 | | 11/2002 | Yamagishi et al. | |
| 6,647,762 B1 | * | 11/2003 | Roy | G01M 3/24 |
| | | | | 73/40.5 A |
| 7,004,146 B1 | | 2/2006 | Kato | |
| 7,814,936 B2 | * | 10/2010 | Catron | G05D 7/0635 |
| | | | | 137/2 |
| 8,210,029 B2 | * | 7/2012 | Hart | G01M 3/022 |
| | | | | 73/37 |
| 9,291,520 B2 | * | 3/2016 | Fleury, Jr. | G01M 3/00 |
| 9,689,518 B2 | * | 6/2017 | Gayer | F16L 41/008 |
| 9,772,250 B2 | * | 9/2017 | Richarz | G01M 3/00 |
| 2003/0226412 A1 | * | 12/2003 | Rumminger | F01N 13/008 |
| | | | | 73/866.5 |
| 2006/0048563 A1 | * | 3/2006 | Martinek | G01M 3/243 |
| | | | | 73/40.5 A |

FOREIGN PATENT DOCUMENTS

| | | |
|---|---|---|
| JP | H10-299956 A | 11/1998 |
| JP | H11-173930 A | 7/1999 |
| JP | 2004-183811 A | 7/2004 |
| JP | 2012-093111 A | 5/2012 |

* cited by examiner

FUEL PIPING STRUCTURE

INCORPORATION BY REFERENCE

This application is based upon and claims the benefit of priority from Japanese patent application No. 2015-215607, filed on Nov. 2, 2015, the disclosure of which is incorporated herein in its entirety by reference.

BACKGROUND OF THE INVENTION

1. Field of the Invention

The present invention relates to a fuel piping structure.

2. Description of Related Art

A fuel piping structure constructed by screwing a male thread part formed at the tip of a sensor main body with a pressure sensor disposed therein into a female thread part formed in a fuel pipe, in which a seal member is disposed between the tip of male thread part and the bottom part of the female thread part has been known (Japanese Unexamined Patent Application Publication No. H10-299956).

However, the present inventors have found the following problem. In the above-described fuel piping structure 100, it is necessary to carry out a leak test to check the sealing property of the seal member 102 (e.g., FIG. 7). However, when a fluid such as air for a leak test is externally fed to the seal member 102 for the leak test, the fluid is blocked in a part 101 where the male thread part of the sensor main body is engaged with the female thread part of the fuel pipe. As a result, the fluid does not reach the seal member 102, thus making the check of the sealing property of the seal member 102 very difficult.

SUMMARY OF THE INVENTION

The present invention has been made to solve the above-described problem and one of the main objects thereof is to provide a fuel piping structure in which the sealing property of a seal member can be easily checked.

To achieve the above-described object, a first exemplary aspect of the present invention is a fuel piping structure including: a fuel pipe through the inside of which fuel flows; a pressure sensor that detects a pressure of the fuel inside the fuel pipe; and a sensor holding part formed in a pillar shape, the sensor holding part including a projecting part formed on the pillar shape, the projecting part projecting to an outer-peripheral side of the pillar shape, the sensor holding part being connected to the fuel pipe by using the projecting part, the sensor holding part holding the pressure sensor disposed therein, the sensor holding part including a communication channel formed therein, the pressure sensor being in communication with the fuel pipe through the communication channel, in which a ring-shaped elastic member is provided between an underside of the projecting part of the sensor holding part and the fuel pipe, the underside of the sensor holding part being pressed against the fuel pipe, a tip side of the sensor holding part is inserted into a recessed part and the communication channel is in communication with the recessed part, the recessed part being formed in the fuel pipe and in communication with the inside of the fuel pipe, a ring-shaped seal member is provided on the tip side of the sensor holding part, and in the sensor holding part, a conduction channel is formed between an end face of the projecting part of the sensor holding part and the seal member, the conduction channel being configured to supply a seal test fluid to the seal member.

According to this aspect, air for a seal test (hereinafter also called a "seal test air") can be supplied to the seal member through the conduction channel and hence the sealing property of the seal member can be easily checked.

In this aspect, the sensor holding part may include: a resin-made sensor main body formed in a column shape, the sensor main body including an outer-peripheral projecting part formed on the column shape, the outer-peripheral projecting part projecting to an outer-peripheral side of the column shape, the sensor main body holding the pressure sensor disposed therein, the sensor main body including a communication channel formed therein, the pressure sensor being in communication with the fuel pipe through the communication channel; and a metal-made sensor main body holder with a through hole formed therein, the sensor main body holder being connected with a flange part of the fuel pipe, the sensor main body holder being configured to hold the sensor main body by having an inner side of the through hole press an outer side of the outer-peripheral projecting part of the sensor main body toward the fuel pipe, a ring-shaped elastic washer may be provided between an underside of the outer-peripheral projecting part and the corresponding flange part, the underside of the outer-peripheral projecting part of the sensor main body of the sensor main body being pressed against the flange part, and the conduction channel may be formed between an inner-peripheral surface of the through hole of the sensor main body holder and an outer-peripheral surface of the outer-peripheral projecting part of the sensor main body. By forming the sensor main body holder from metal as described above, it is possible to fix the sensor main body to the fuel pipe while giving stiffness to the fuel pipe. Meanwhile, by forming the sensor main body from a resin, it is possible to reduce the manufacturing cost.

In this aspect, the conduction channel may be a cut-out groove part formed in at least one of the inner-peripheral surface of the through hole of the sensor main body holder and the outer-peripheral surface of the outer-peripheral projecting part of the sensor main body in an axial direction of the sensor main body, extending from one end of the inner-peripheral surface of the through hole of the sensor main body holder or the outer-peripheral surface of the outer-peripheral projecting part of the sensor main body to the other end thereof.

To achieve the above-described object, another exemplary aspect of the present invention may be a leak test apparatus including: a masking jig that covers an outer side of the sensor holding part of a fuel piping structure described in one of the above-described aspects; a fluid supply device that supplies a fluid having a predetermined pressure to inside of the masking jig; and a pressure measurement device that measures a pressure inside the masking jig.

To achieve the above-described object, another exemplary aspect of the present invention may be a leak test method including: a step of, by a masking jig, covering an outer side of the sensor holding part of a fuel piping structure described in one of the above-described aspects; a step of supplying a fluid having a predetermined pressure to inside of the masking jig; and a step of measuring a pressure inside the masking jig.

According to the present invention, it is possible to provide a fuel piping structure in which the sealing property of a seal member can be easily checked.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Figure 1:
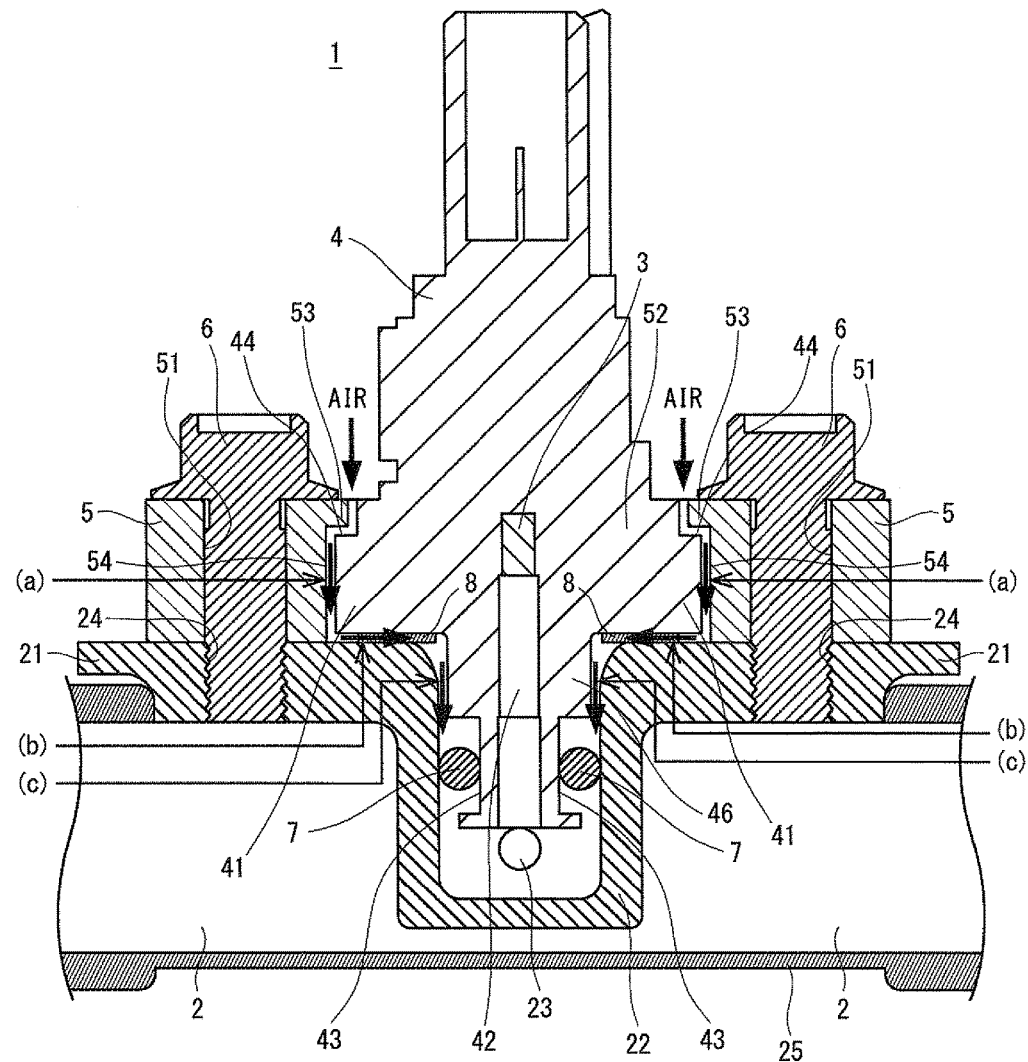
FIG. 1 is a cross section showing a schematic configuration of a fuel piping structure according to an exemplary embodiment of the present invention.

Exemplary embodiments according to the present invention are explained hereinafter with reference to the drawings. FIG. 1 is a cross section showing a schematic configuration of a fuel piping structure according to an exemplary embodiment of the present invention. A fuel piping structure 1 according to this exemplary embodiment includes a fuel pipe 2 through the inside of which fuel such as light oil flows, a pressure sensor 3 that detects the pressure of the fuel inside the fuel pipe 2, a sensor main body 4 that holds the pressure sensor 3 disposed therein, and a sensor main body holder 5 that holds the sensor main body 4.

Figure 2:
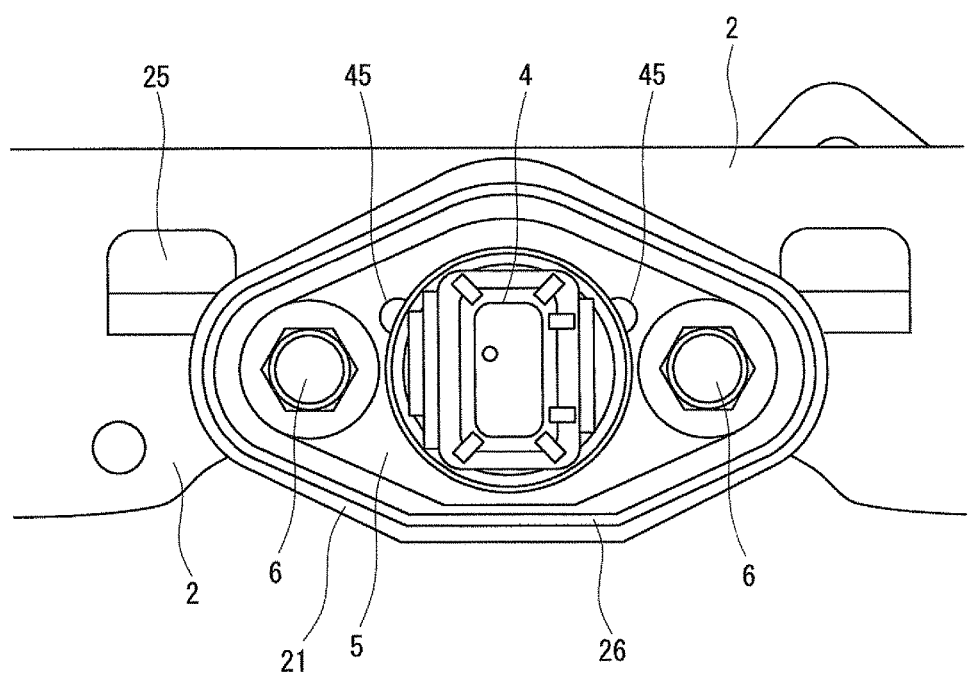
FIG. 2 is a top view showing a schematic configuration of a fuel piping structure according to an exemplary embodiment of the present invention.

The fuel pipe 2 is, for example, a high-pressure delivery pipe of an engine. A flange part 21 is formed in the fuel pipe 2. The flange part 21 is formed roughly in an elliptic shape as viewed from the top (FIG. 2). A recessed part 22 into which a tip side 46 of the sensor main body 4 is inserted is formed at or near the center of the flange part 21. The recessed part 22 is in communication with the inside of the fuel pipe 2 through a bypass pipe 23. Note that the bypass pipe 23 is provided because the position of the sensor main body 4 is shifted (is offset) from a main body 25 of the fuel pipe 2 due to the restriction on the layout of the fuel piping structure. The recessed part 22 may be in direct communication with the inside of the fuel pipe 2 without using the bypass pipe 23 by, for example, forming an opening in the recessed part 22.

Although the flange part 21 is formed as a separate member from the main body 25 of the fuel pipe 2, the structure of the flange part 21 is not limited to this example. The flange part 21 may be integrally formed with the main body 25 of the fuel pipe 2. A pair of female thread parts 24 into which bolts 6 are screwed in order to connect the sensor main body holder 5 with the flange part 21 are formed in the flange part 21. A seal member 26 is provided along the fringe of the flange part 21. This seal member 26 is, for example, an O-ring made of rubber.

The sensor main body 4 is formed roughly in a column shape and an outer-peripheral projecting part 41 projecting to the outer-peripheral side in a ring shape is formed on the column. In the sensor main body 4, a communication channel 42 through which the pressure sensor 3 is in communication with the fuel pipe 2 is formed in the axial direction (longitudinal direction) of the sensor main body 4. The sensor main body 4 is formed from, for example, a resin. As a result, the manufacturing cost of the sensor main body 4 can be reduced.

On the tip side 46 of the sensor main body 4, a groove part 43 is formed in the circumference direction. A ring-shaped seal member 7 is provided in the groove part 43. The seal member 7 is, for example, an O-ring made of rubber. The tip side 46 of the sensor main body 4 is inserted into the recessed part 22 of the flange part 21 of the fuel pipe 2. The seal member 7 on the tip side 46 of the sensor main body 4 is in tight contact with the inner-peripheral surface of the recessed part 22 of the flange part 21 of the fuel pipe 2.

Fuel in the fuel pipe 2 is supplied into the recessed part 22 of the flange part 21 of the fuel pipe 2 through the bypass pipe 23. The communication channel 42 of the sensor main body 4 is in communication with the recessed part 22 of the flange part 21 of the fuel pipe 2. Therefore, the pressure sensor 3 detects the pressure of the fuel inside the fuel pipe 2, which is supplied through the bypass pipe 23, the recessed part 22 of the flange part 21, and the communication channel 42 of the sensor main body 4. Note that the seal member 7 prevents the fuel contained inside the recessed part 22 of the flange part 21 of the fuel pipe 2 from leaking to the outer side of the seal member 7 (i.e., into the later-described conduction channels (a), (b) and (c)).

Further, a gap(s) is formed between the outer-peripheral surface of the tip side 46 of the sensor main body 4 and the inner-peripheral surface of the recessed part 22 of the flange part 21 of the fuel pipe 2. This gap(s) serves as a conduction channel(s) for the later-described seal test air when the seal test air is supplied to the seal member 7 on the tip side 46 of the sensor main body 4.

The sensor main body holder 5 is made of metal and formed roughly in an elliptic shape. By forming the sensor main body holder 5 from metal as described above, the sensor main body 4 is fixed to the fuel pipe 2 while giving stiffness to the fuel pipe 2. Meanwhile, by forming the sensor main body 4 from a resin, the manufacturing cost of the sensor main body 4 is reduced as described previously.

A pair of bolt holes 51 are formed in the sensor main body holder 5. By inserting a pair of bolts (tightening member) 6 into the pair of bolt holes 51 and screwing them into the respective female thread parts 24 formed in the flange part 21 of the fuel pipe 2, the sensor main body holder 5 is connected to the flange part 21 of the fuel pipe 2.

Note that although the sensor main body holder 5 is connected to the flange part 21 of the fuel pipe 2 by the pair of bolts 6, the connection method is not limited to this example. The number of bolts 6 for connecting the sensor main body holder 5 with the flange part 21 of the fuel pipe 2 may be arbitrarily determined. Further, for example, male threads may be provided in the flange part 21 of the fuel pipe 2 and nuts may be tightened on these male threads. That is, the method for connecting the sensor main body holder 5 with the flange part 21 of the fuel pipe 2 may be arbitrarily determined.

Figure 6:
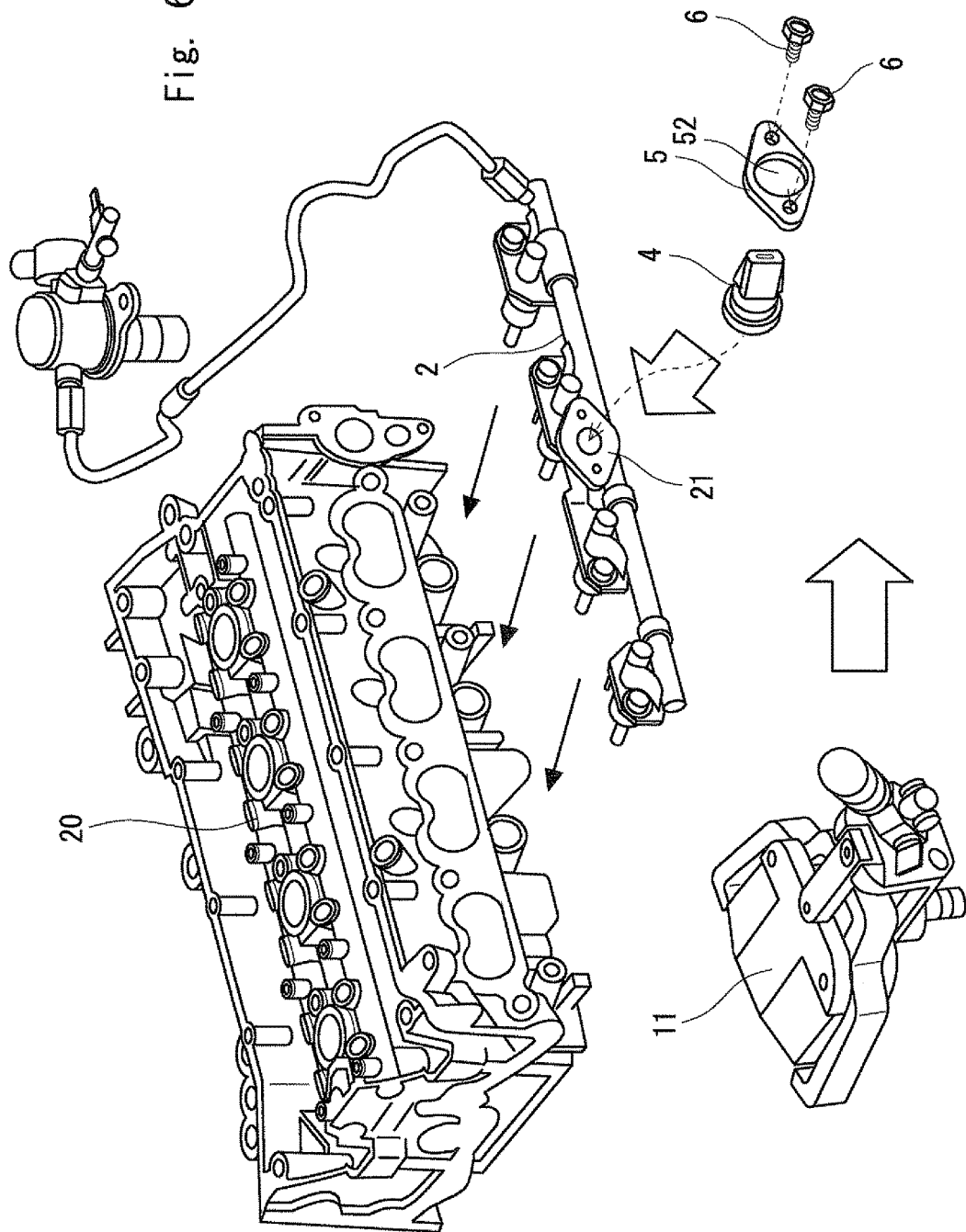
FIG. 6 is a figure for explaining a leak test method.

A through hole 52 is formed at the center of the sensor main body holder 5 (FIG. 6). On the upper end edge of the through hole 52 of the sensor main body holder 5, a projecting edge part 53 projecting toward the center of the through hole 52 is formed along the circumferential direction thereof. Meanwhile, on the upper end edge of the outer-peripheral projecting part 41 of the sensor main body 4, a recessed edge part 44, which is cut out in a recessed shape, is formed along the circumferential direction so as to conform to the projecting edge part 53 of the through hole 52 of the sensor main body holder 5.

The projecting edge part 53 of the through hole 52 of the sensor main body holder 5 is mated with the recessed edge part 44 of the outer-peripheral projecting part 41 of the sensor main body 4. As a result, the sensor main body holder 5 holds the sensor main body 4 by having the projecting edge part 53 on the inner side of the through hole 52 press the recessed edge part 44 on the outer side of the outer-peripheral projecting part 41 of the sensor main body 4 toward the fuel pipe.

Figure 3:
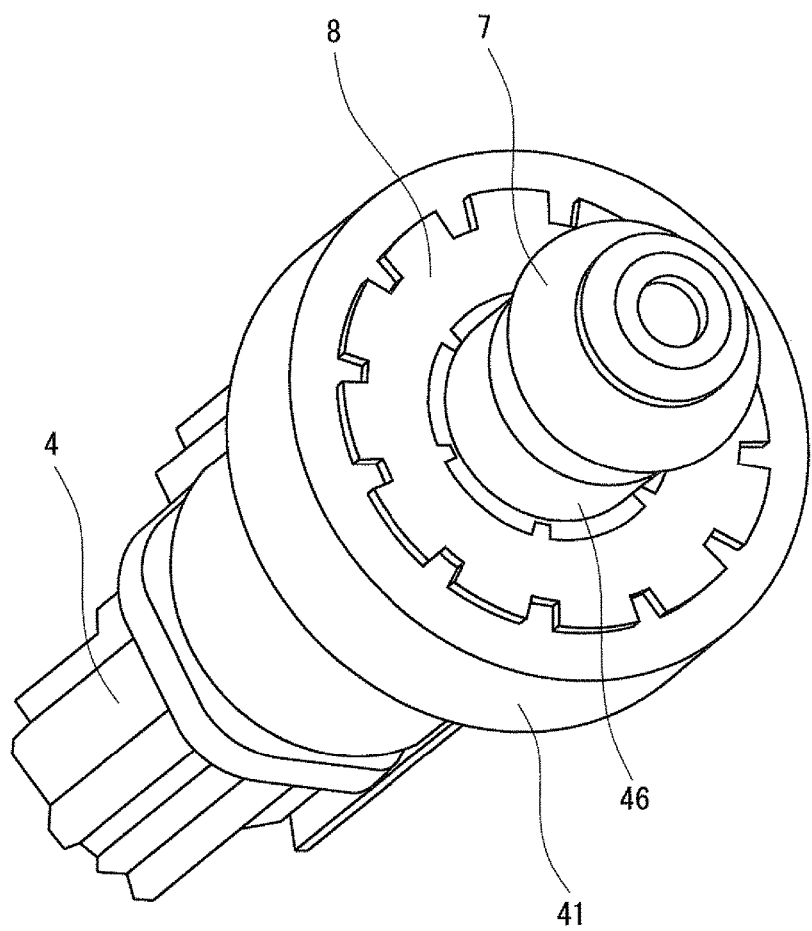
FIG. 3 is a perspective view showing an example of a leaf spring washer.

A leaf spring washer 8 is provided between the underside of the outer-peripheral projecting part 41 of the sensor main body 4, which is pressed against the flange part 21 of the fuel pipe 2, and the flange part 21 (FIG. 3). The leaf spring washer 8 is, for example, a ring-shaped elastic member made of metal and a plurality of cut-out parts are formed in the leaf spring washer 8 along the circumferential direction thereof.

This leaf spring washer 8 forms a gap(s) between the underside of the outer-peripheral projecting part 41 and the flange part 21 while absorbing vibrations of the sensor main body 4 caused by pulsations of fuel flowing through the fuel pipe 2 by its elasticity. This gap serves as a conduction channel for seal test air when the seal test air is supplied to the seal member 7 on the tip side 46 of the sensor main body 4 (which is described later).

A conduction channel for supplying seal test air to the seal member 7 is formed between the inner-peripheral surface of the through hole 52 of the sensor main body holder 5 and the outer-peripheral surface of the outer-peripheral projecting part 41 of the sensor main body 4.

For example, on the inner-peripheral surface of the through hole 52 of the sensor main body holder 5, a pair of cut-out groove parts 54 extending along the axial direction of the sensor main body 4 from the upper end (one end) of the inner-peripheral surface to the lower end (other end) thereof (i.e., to the flange part 21 of the fuel pipe 2) are formed as conduction channels. However, the structure of the conduction channel is not limited to this example. For example, on the outer-peripheral surface of the outer-peripheral projecting part 41 of the sensor main body 4, cut-out groove parts extending along the axial direction of the sensor main body 4 from the upper end (one end) of the outer-peripheral surface to the lower end (other end) thereof may be formed as conduction channels. Further, on both the inner-peripheral surface of the through hole 52 of the sensor main body holder 5 and the outer-peripheral surface of the outer-peripheral projecting part 41 of the sensor main body 4, cut-out groove parts extending along the axial direction of the sensor main body 4 from the upper end (one end) of these surfaces to the lower end (other end) thereof may be formed as conduction channels. The number, the position and the shape of formed cut-out parts may be arbitrarily determined.

Figure 7:
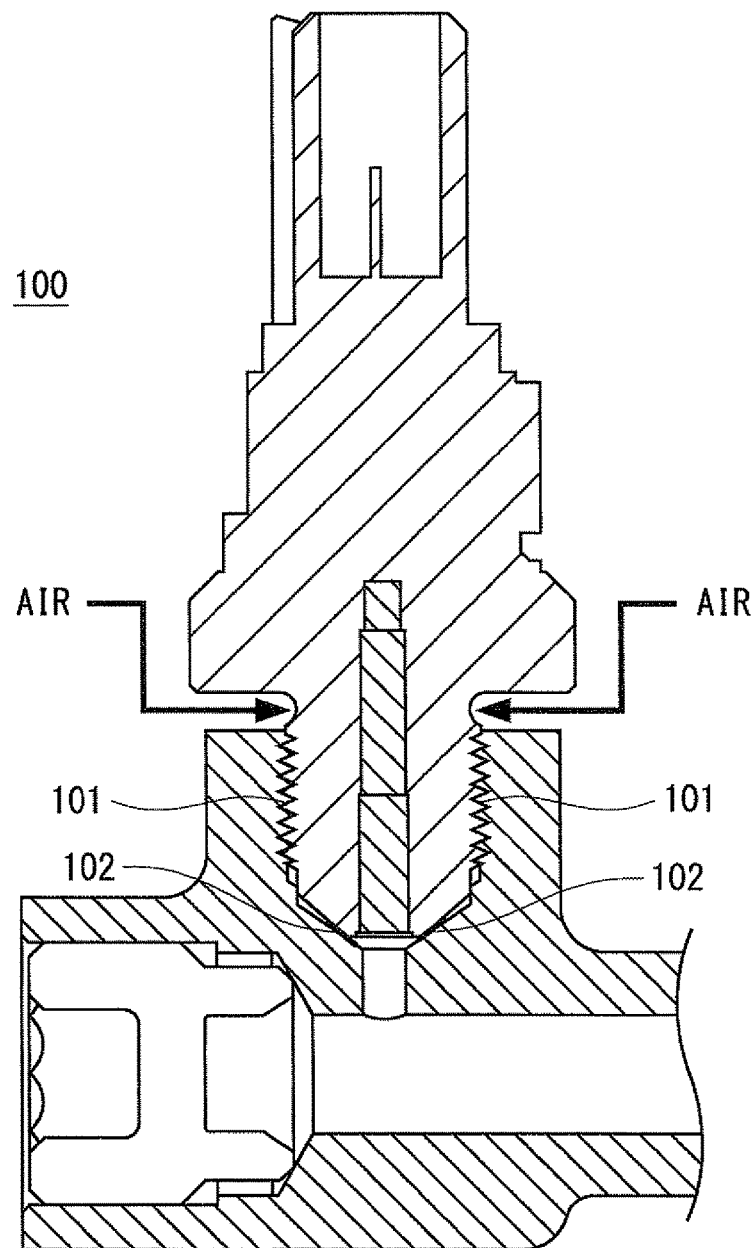
FIG. 7 is a cross section showing a schematic configuration of a fuel piping structure in related art.

Incidentally, in the fuel piping structure 100 in the related art, when leak test air is externally fed to the seal member 102, for example, the leak test air is blocked in the part 101 where the male thread part of the sensor main body is engaged with the female thread part of the fuel pipe (hereinafter also called an "engaging part 101") (FIG. 7). As a result, the air does not reach the seal member 102, thus making the check of the sealing property of the seal member 102 very difficult.

In particular, it is very difficult to keep the torque, with which the male thread part of the sensor main body is screwed into the female thread part of the fuel pipe, constant in the fuel piping structure 100 in the related art. As a result, the contact of the metal seal member 102 disposed at the tip of the sensor main body becomes irregular and hence a leak from the seal member 102 could occur. However, even when a leak from the seal member 102 occurs, the fed leak test air is blocked by the engaging part 101. Therefore, even though the leak from the seal member 102 occurs, it appears as if no leak from the sealing part 102 occurs. In such a case, when the engine is actually in operation, a gap is formed in the engaging part 101 due to changes in temperature (high/low temperatures) thereof and/or the vibrations thereof. Therefore, the fuel in the fuel pipe leaks through the engaging part 101 and the seal member 102.

Accordingly, in the leak test, it is particularly important to feed leak test air to the seal member in order to check the sealing property of the seal member itself.

To that end, in the fuel piping structure 1 according to this exemplary embodiment, as described above, the conduction channel(s) for supplying seal test air to the seal member 7 of the sensor main body 4 is formed from the upper end of the inner-peripheral surface of the through hole 52 of the sensor main body holder 5 or the outer-peripheral surface of the outer-peripheral projecting part 41 of the sensor main body 4 to the seal member 7. As a result, it is possible to feed seal test air to the seal member 7 of the sensor main body 4 through the conduction channel(s) and thereby easily check the sealing property of the seal member 7.

It should be noted that the fuel piping structure 1 according to this exemplary embodiment has a simple structure that is obtained just by inserting the tip side 46 of the sensor main body 4 in which the seal member 7 is disposed into the recessed part 22 of the flange part 21 of the fuel pipe 2 and assembling the sensor main body 4 into the fuel pipe 2 by the sensor main body holder 5.

In particular, when the tip side 46 of the sensor main body 4 is inserted into the recessed part 22 of the flange part 21 of the fuel pipe 2, the insertion may be carried out by just inserting the tip side 46 into the recessed part 22 while obeying to the elasticity of the seal member 7 on the tip side 46. Therefore, the insertion rarely ends in failure. Therefore, in comparison to the above-described related-art screwing method (the method in which the torque is adjusted), the assembling process is significantly easy and the reliability thereof is very high.

Next, a method for making seal test air reach the seal member on the tip side of the sensor main body through the conduction channel is explained in detail.

The seal test air first passes through the conduction channel (a) of the cut-out groove part 54 formed on the inner-peripheral surface of the through hole 52 of the sensor main body holder 5. Next, the air, which has passed through the aforementioned conduction channel, passes through the conduction channel (b) of the gap formed by the leaf spring washer 8 between the underside of the outer-peripheral projecting part 41 of the sensor main body 4 and the flange part 21. Further, the air, which has passed through the aforementioned conduction channel, passes through the conduction channel (c) of the gap between the outer-peripheral surface of the tip side 46 of the sensor main body 4 and the inner-peripheral surface of the recessed part 22 of the flange part 21 of the fuel pipe 2 and reaches the seal member 7 on the tip side 46 of the sensor main body 4. In this way, the seal test air can reach the seal member 7 on the tip side 46 of the sensor main body 4 through the conduction channels.

Figure 4:
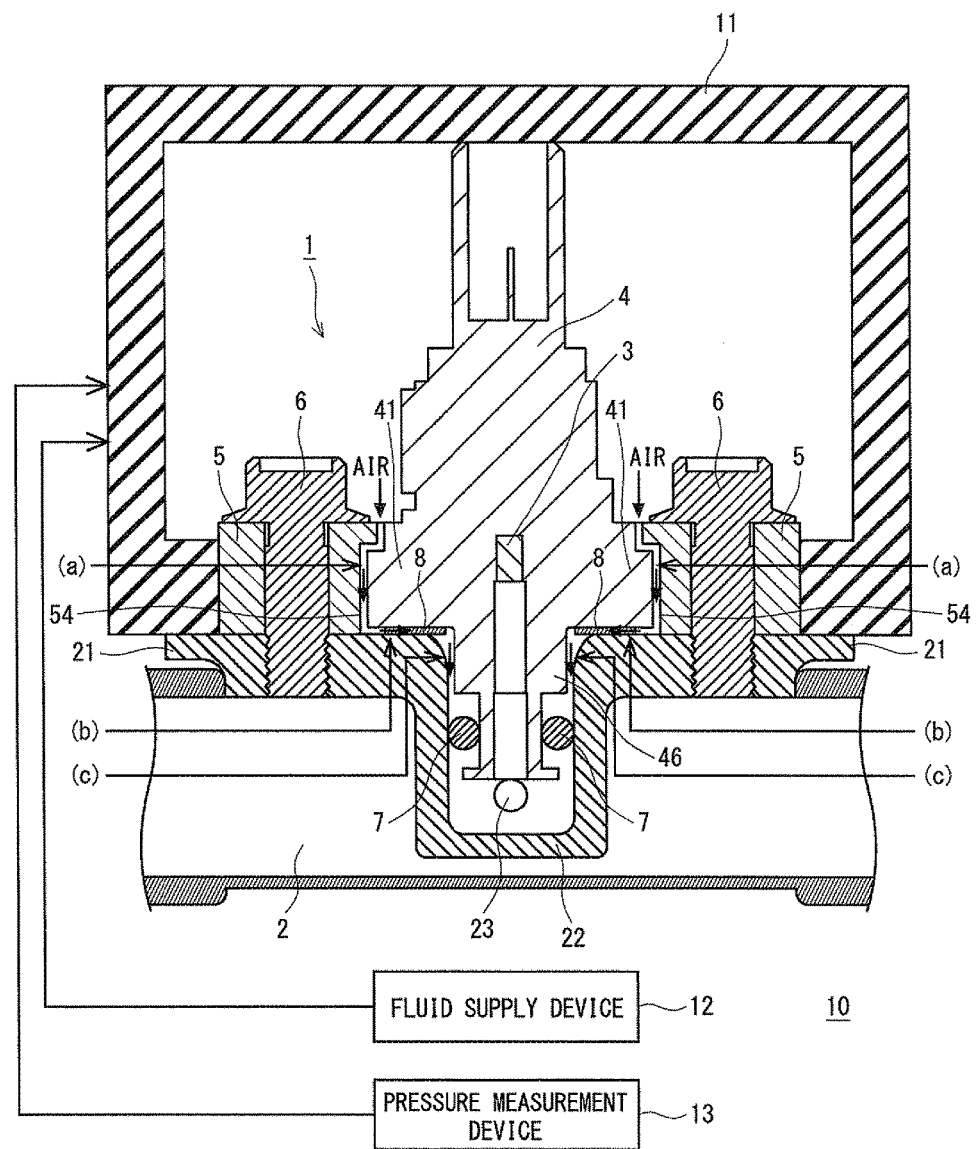
FIG. 4 is a block diagram showing a schematic system configuration of a leak test apparatus.

FIG. 4 is a block diagram showing a schematic system configuration of a leak test apparatus used to carry out a leak test for the above-described fuel piping structure.

A leak test apparatus 10 according to this exemplary embodiment includes a masking jig 11 that covers the outer side of the sensor main body 4 and the sensor main body holder 5 of the fuel piping structure 1, a fluid supply device 12 that supplies compressed air having a predetermined pressure to the inside of the masking jig 11, and a pressure measurement device 13 that measures the pressure inside the masking jig 11.

The masking jig 11 is assembled into the flange part 21. The fluid supply device 12 is, for example, formed by a pump or the like and supplies compressed air (e.g., 350 kpa) to the inside of the masking jig 11. Note that although the fluid supply device 12 supplies compressed air into the masking jig 11, the fluid supplied to the inside of the masking jig 11 is not limited to this example. For example, a gas other than air or a liquid may be supplied to the inside of the masking jig 11.

The pressure measurement device 13 is constituted from a pressure sensor or the like that measures the pressure inside the masking jig 11. For example, when a pressure difference between the pressure value inside the masking jig 11 detected by the pressure sensor and a predetermined pressure becomes equal to or higher than a predetermined value, the pressure measurement device 13 determines that an air leak from the seal member 7 on the tip side 46 of the sensor main body 4 of the fuel piping structure 1 occurs.

As shown in FIG. 1, the compressed air contained inside the masking jig 11 passes through the conduction channel (a) of the cut-out groove part 54 on the inner-peripheral surface of the through hole 52 of the sensor main body holder 5, the conduction channel (b) in the leaf spring washer 8, and the conduction channel (c) of the gap on the outer-peripheral surface of the tip side 46 of the sensor main body 4, and reaches the seal member 7 on the tip side 46 of the sensor main body 4. Note that when a leak occurs due to the unseating or damage of the seal member 7, the leaked compressed air flows from the seal member 7 to the recessed part 22 of the flange part 21 and into the fuel pipe 2 through the bypass pipe 23. As a result, the pressure of the compressed air contained inside the masking jig 11 is lowered. The pressure measurement device 13 detects the air leak from the seal member 7 on the tip side 46 of the sensor main body 4 of the fuel piping structure 1 by detecting this decrease in the pressure.

When the pressure measurement device 13 detects the air leak from the seal member 7 on the tip side 46 of the sensor main body 4 of the fuel piping structure 1, the pressure measurement device 13 informs a user of the air leak by, for example, displaying the pressure difference, displaying a warning, producing a warning sound, turning on a warning lamp, and so on.

Figure 5:
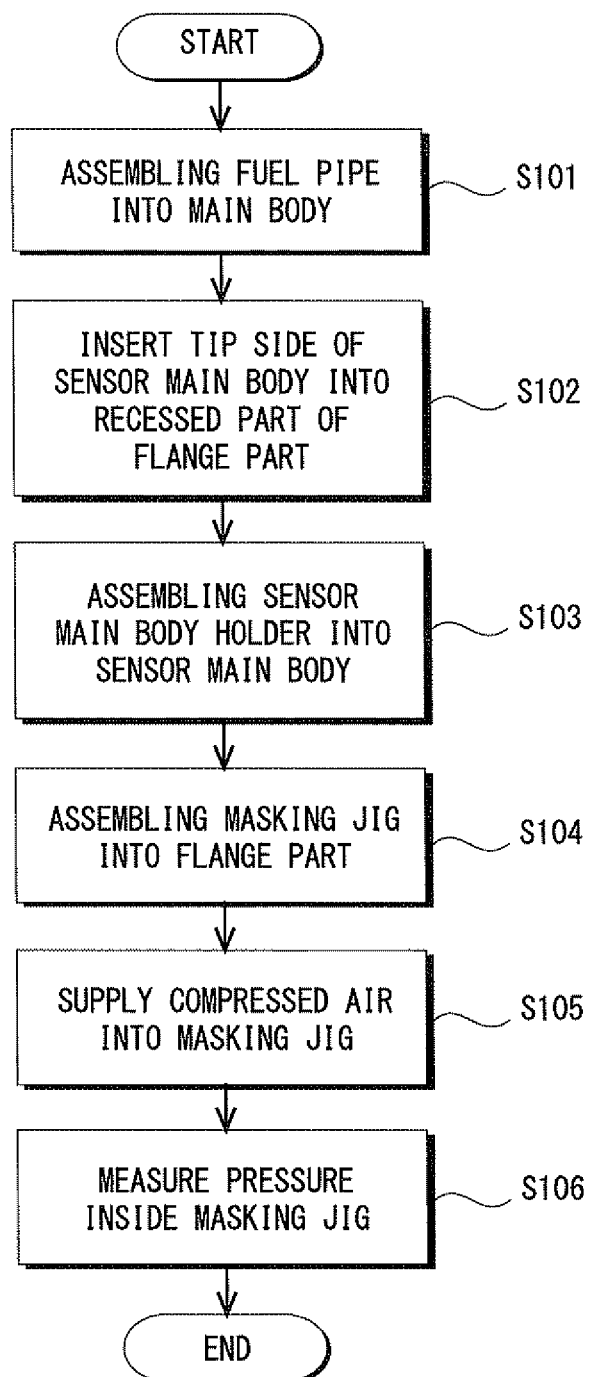
FIG. 5 is a flowchart showing a flow of a leak test method for a fuel piping structure according to an exemplary embodiment of the present invention.

FIG. 5 is a flowchart showing a flow of a leak test method for the fuel piping structure according to this exemplary embodiment.

As shown in FIG. 6, the fuel pipe (high-pressure delivery pipe) 2 is assembled into an engine main body 20 (step S101). Next, the tip side 46 of the sensor main body 4 is inserted into the recessed part 22 of the flange part 21 of the fuel pipe 2 (step S102). The sensor main body holder 5 is assembled into the sensor main body 4 and the sensor main body holder 5 is fixed to the flange part 21 of the high-pressure delivery pipe 2 by using a pair of bolts 6 (step S103). The masking jig 11 is assembled into the flange part 21 of the fuel pipe 2 (step S104). The fluid supply device 12 supplies compressed air having a predetermined pressure to the inside of the masking jig 11 (step S105). The pressure measurement device 13 measures the pressure inside the masking jig 11 (step S105).

As described above, the fuel piping structure 1 according to this exemplary embodiment includes: the sensor main body 4 formed in a column shape, the sensor main body 4 including the outer-peripheral projecting part 41 formed on the column shape, the outer-peripheral projecting part 41 projecting to the outer-peripheral side of the column shape, the sensor main body 4 holding the pressure sensor 3 disposed therein, the sensor main body 4 including the communication channel 42 formed therein, the pressure sensor 3 being in communication with the fuel pipe 2 through the communication channel 42; and the sensor main body holder 5 with the through hole 52 formed therein, the sensor main body holder 5 being connected with the recessed flange part 21 of the fuel pipe 2 by the tightening member, the sensor main body holder 5 being configured to hold the sensor main body 4 by having the inner side of the through hole 52 press the outer side of the outer-peripheral projecting part 41 of the sensor main body 4 toward the fuel pipe. The ring-shaped seal member 7 is disposed in the groove part 43 formed in the circumferential direction on the tip side 46 of the sensor main body 4. The tip side 46 of the sensor main body 4 is inserted into the recessed part 22, which is formed in the fuel pipe 2 and in communication with the inside of the fuel pipe 2, and the communication channel 42 is in communication with the recessed part 22. The ring-shaped elastic leaf spring washer 8 is disposed between the underside of the outer-peripheral projecting part 41 of the sensor main body 4, which is pressed against the flange part 21, and the corresponding flange part 21. The conduction channel is formed between the inner-peripheral surface of the through hole 52 of the sensor main body holder 5 and the outer-peripheral surface of the outer-peripheral projecting part 41 of the sensor main body 4.

As a result, seal test air contained inside the jig, which covers the fuel piping structure 1, can pass through the conduction channel between the inner-peripheral surface of the through hole 52 of the sensor main body holder 5 and the outer-peripheral surface of the outer-peripheral projecting part 41 of the sensor main body 4 and the conduction channel in the leaf spring washer 8, and reach the seal member 7 on the tip side 46 of the sensor main body 4. Therefore, it is possible to feed seal test air to the seal member 7 of the sensor main body 4 through the conduction channels and thereby easily check the sealing property of the seal member 7.

Note that the present invention is not limited to the above-described exemplary embodiments, and various modifications can be made without departing from the spirit and scope of the present invention.

In the above-described exemplary embodiment, the sensor main body holder 5 may be integrally formed with the sensor main body 4. By doing so, the number of components can be reduced and the assembling property can be improved. In this case, a through hole(s) that passes through the integrally-formed sensor main body 4 and the sensor main body holder 5 from the upper end surface thereof to the lower end surface thereof (i.e., to the flange part 21) may be formed as the above-described conduction channel(s).

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A fuel piping structure comprising:
   a fuel pipe through the inside of which fuel flows;
   a pressure sensor that detects a pressure of the fuel inside the fuel pipe;
   a sensor main body formed in a column shape, the sensor main body comprising an outer-peripheral projecting part formed on the column shape, the outer-peripheral projecting part projecting to an outer-peripheral side of the column shape, the sensor main body being connected to the fuel pipe by using the projecting part, the sensor main body holding the pressure sensor disposed therein, the sensor main body comprising a communication channel formed therein, the pressure sensor being in communication with the fuel pipe through the communication channel; and
   a sensor main body holder with a through hole formed therein, the sensor main body holder being connected with a flange part of the fuel pipe, the sensor main body holder being configured to hold the sensor main body by having an inner side of the through hole press an outer side of the outer-peripheral projecting part of the sensor main body toward the fuel pipe,
   wherein
   a ring-shaped elastic washer is provided between an underside of the outer-peripheral projecting part of the sensor main body and the flange part of the fuel pipe, the underside of the outer-peripheral projecting part of the sensor main body being pressed against the flange part,
   a tip side of the sensor main body is inserted into a recessed part and the communication channel is in communication with the recessed part, the recessed part being formed in the fuel pipe and in communication with the inside of the fuel pipe,
   a ring-shaped seal member is provided on the tip side of the sensor main body, and
   a conduction channel is formed and includes a first portion between an inner-peripheral surface of the through hole of the sensor main body holder and an outer-peripheral surface of the outer-peripheral projecting part of the sensor main body, a second portion including a gap formed by the ring-shaped elastic washer, and a third portion including a gap between an outer-peripheral surface on the tip side of the sensor main body and an inner-peripheral surface of the recessed part of the fuel pipe, the conduction channel being configured to supply a seal test fluid to the seal member, and
   wherein a masking jig covers an outer side of the sensor main body and main body holder to permit application of the seal test fluid into the conduction channel such that the seal test fluid reaches the seal member.

2. The fuel piping structure according to claim 1, wherein the sensor main body is comprised of a resin, and the main body holder is comprised of a metal.

3. The fuel piping structure according to claim 1, wherein the first portion of the conduction channel is a cut-out groove part formed in at least one of the inner-peripheral surface of the through hole of the sensor main body holder and the outer-peripheral surface of the outer-peripheral projecting part of the sensor main body in an axial direction of the sensor main body, extending from one end of the inner-peripheral surface of the through hole of the sensor main body holder or the outer-peripheral surface of the outer-peripheral projecting part of the sensor main body to the other end thereof.

* * * * *